(12) United States Patent
Cai

(10) Patent No.: US 7,057,195 B2  
(45) Date of Patent: Jun. 6, 2006

(54) SCANNER AND CALIBRATION METHOD USED THEREIN

(75) Inventor: Ming Cai, Su Jhuo (CN)

(73) Assignee: Benq Corporation, Taoyuan (TW)

( * ) Notice: Subject to any disclaimer, the term of this patent is extended or adjusted under 35 U.S.C. 154(b) by 238 days.

(21) Appl. No.: 10/843,762

(22) Filed: May 12, 2004

(65) Prior Publication Data

US 2004/0232361 A1 Nov. 25, 2004

(30) Foreign Application Priority Data

May 22, 2003 (TW) ............................... 92113826 A

(51) Int. Cl.  
*G01N 21/86* (2006.01)  
*H04N 1/00* (2006.01)

(52) U.S. Cl. .................................. 250/559.1; 358/406

(58) Field of Classification Search ............ 250/559.1; 358/406  
See application file for complete search history.

(56) References Cited

U.S. PATENT DOCUMENTS 5,563,723 A * 10/1996 Beaulieu et al. ............ 358/461  
2004/0165091 A1* 8/2004 Takemura et al. .......... 348/296

* cited by examiner

*Primary Examiner*—Brian J. Livedalen  
(74) *Attorney, Agent, or Firm*—Thomas, Kayden, Horstemeyer & Risley

(57) ABSTRACT

A scanner and calibration method use therein. Setting first exposure duration and a second exposure duration for a transparency, wherein the first exposure duration is proportional to the second exposure duration. Scanning the transparency and a calibration area to produce a scan signal and a calibration signal, respectively, wherein the exposure duration for scanning the transparency is referred to as the first exposure duration, and the exposure duration for scanning the calibration area is referred to as the second exposure duration. Calculating a first gain coefficient according to the calibration signal. Calculating a second gain coefficient according to the first gain coefficient and a specific ratio of the first exposure duration to the second exposure duration, and finally, amplifying the scan signal by the second gain coefficient.

21 Claims, 7 Drawing Sheets

SCANNER AND CALIBRATION METHOD USED THEREIN

BACKGROUND OF THE INVENTION

1. Field of the Invention

The present invention relates to a calibration method, and more particularly to an effective calibration method used by a transparency scanner.

2. Description of the Related Art

Currently, a plate scanner, to scan a transparency, may use a scanning mask. However, the transparency, including a positive film or a negative film, has a wider exposure margin than a non-transparent object due to the film substrate, and requires longer exposure duration. Thus, when scanning the transparency, the plate scanner must be calibrated with increased exposure duration. Typically, there are two methods for calibrating a scanner. The first calibration method results in excessive exposure duration, easily causing a saturation of the scan signal. The second calibration method places transparent tape above a calibration area. This method, however, has a complex design, higher manufacturing cost, and low precision.

FIG. 1a is a block diagram of a conventional scanner. FIG. 1b is a schematic figure of an object placed on the platen of the scanner of FIG. 1a. In FIG. 1a and FIG. 1b, a glass platen 120 is installed between a lamp 102 and a charge-coupled capture device 104, and has a calibration area 122 and a scanning area 124, and a transparency 126 is placed on the scanning area 124.

When scanning the transparency 126, the calibration area 122 is also scanned according to the same exposure duration, to produce an analog scan signal SA and an analog calibration signal, respectively. A signal processing device 106 then converts the analog scan signal SA into a digital scan signal SD. The image processing device 110, then receives the digital scan signal DA, for related image processing.

To prevent data loss, however, the analog scan signal SA must be amplified by a gain coefficient before conversion, wherein the gain coefficient is calculated by the calibration signal.

FIG. 2 is a curve of a scan signal of the scanner of FIG. 1a. In FIG. 2, a scan signal 22 is a signal output from the charge-coupled capture device 104, and a signal 24 is a product of the scan signal 22 and a gain coefficient. The amplitude of the scan signal 22 is between 0 to M1, and a range of a digital scan signal converted from the scan signal 22 is between 0 to D1. Commonly, an ideal range of the digital scan signal is between 0 to D2, while D2 is the maximum digital value after the conversion. The maximum digital value, for example, of an 8 bit signal processing device is 255 or near 255 calculated by $2^8-1$.

Thus, to obtain ideal digital signal range, the original scan signal 22, must be amplified into the signal 24 having an amplitude range between 0 to M2 by the calibration signal before conversion.

The exposure duration of scan signal 22, however, is affected by different film substrates. Hence, when using the same exposure duration to scan the calibration area and the transparency 126, according to the related art, a suitable gain coefficient for amplifying the scan signal 22 to be converted into the digital scan signal having the maximum digital value D2 cannot be obtained.

Therefore, the present invention provides a calibration method using two different exposure durations to obtain a suitable calibration signal and a scan signal, respectively. The scan signal is then calibrated according to the calibration signal thereby obtaining a digital scan signal having a maximum digital value.

SUMMARY OF THE INVENTION

The object of the present invention is to provide a method for scanning and calibrating an object using two different exposure durations, thereby calculating a gain coefficient by a specific ratio to obtain a digital scan signal having a maximum digital value.

Another object of the present invention is to provide a scanner using multiple exposures of varying duration, thereby calculating a gain coefficient based on a specific calibration to scan signal ratio with the resulting analog scan signal, finally generating digital scan signal providing an ideal calibration range after conversion.

For the purpose above, the present invention provides a calibration method comprising the steps of setting a first exposure duration and a second exposure duration according to a transparency, wherein the first exposure duration is proportional to the second exposure duration, scanning the transparency and the calibration area to produce a scan signal and a calibration signal, respectively, wherein the exposure duration for scanning the transparency is referred to as the first exposure duration, and the exposure duration for scanning the calibration area is referred to as the second exposure duration, calculating a first gain coefficient according to the calibration signal, calculating a second gain coefficient according to the first gain coefficient and a specific ratio of the first exposure duration to the second exposure duration; and amplifying the scan signal by the second gain coefficient.

Additionally, the present invention provides a scanner having an optical image capture system, an optical sensing capture device and a signal processing device. The image capture system scans a transparency for first exposure duration to produce a scan signal, and scans a calibration area for second exposure duration to produce a calibration signal. The signal processing device calculates a first gain coefficient according to the calibration signal, calculates a second gain coefficient according to the first gain and a specific ratio, and amplifies and converts the scan signal into a digital signal according to the second gain coefficient.

Furthermore, the present invention provides another calibration method comprising the steps of scanning a transparency according to a first exposure duration to produce various image data, converting the image data into various digital data, and analyzing the digital data to obtain a maximum value of the digital data, calculating a gain coefficient according to the maximum value, wherein the gain coefficient is a maximum gain value for amplifying the image data to be converted, calculating a second exposure duration by a product of the gain coefficient and the first exposure duration, and scanning the transparency with the second exposure duration to obtain an ideal scan signal.

BRIEF DESCRIPTION OF THE DRAWINGS

The present invention can be more fully understood by reading the subsequent detailed description in conjunction with the examples and references made to the accompanying drawings, wherein:

FIG. 1b is a schematic figure of an object placed on the glass platen of the scanner of FIG. 1a;

FIG. 2 is a curve of a scan signal of the scanner of FIG. 1a;

FIG. 4b is schematic figure of an object placed on a glass platen of the scanner of FIG. 4a;

DETAILED DESCRIPTION OF THE INVENTION

The object of the present invention is to provide a method for scanning and calibrating an object using two different exposure durations, thereby calculating a gain coefficient by a specific ratio to obtain a digital scan signal having a maximum digital value.

First Embodiment

Figure 1A:
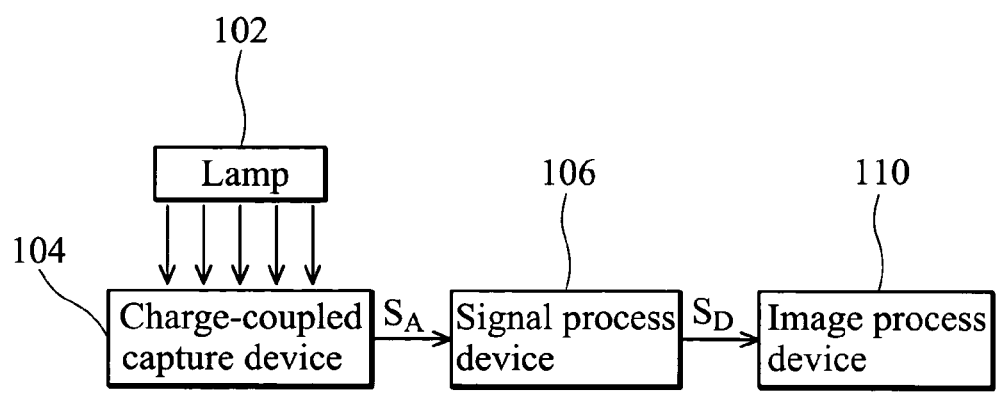
FIG. 1a is a block diagram of a scanner according to the prior art.
Figure 1B:
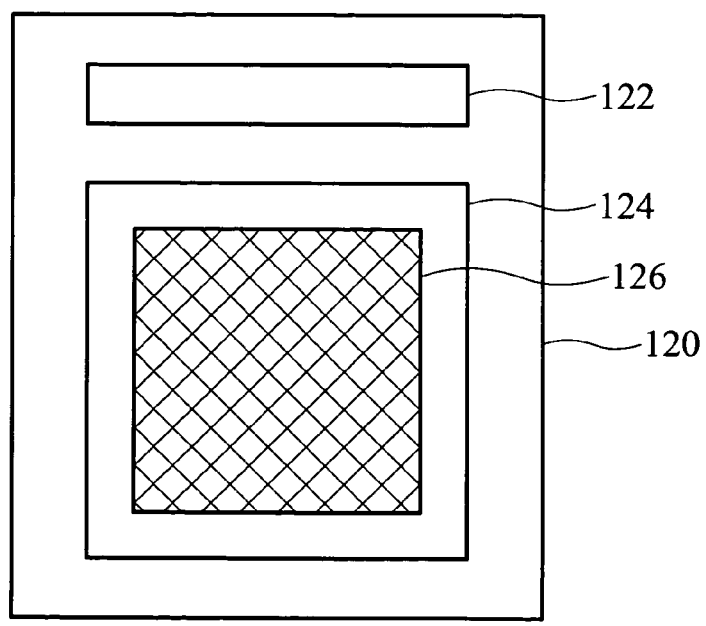
Figure 2:
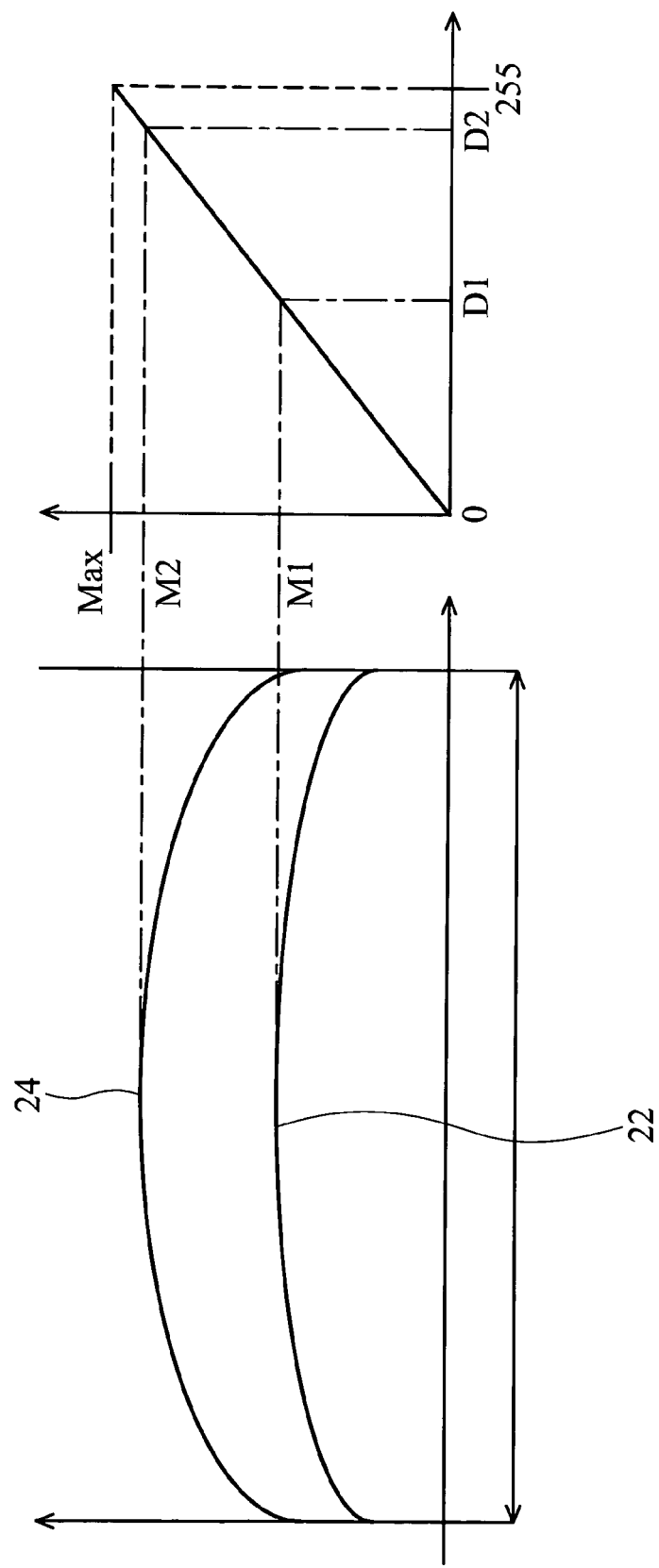
Figure 3:
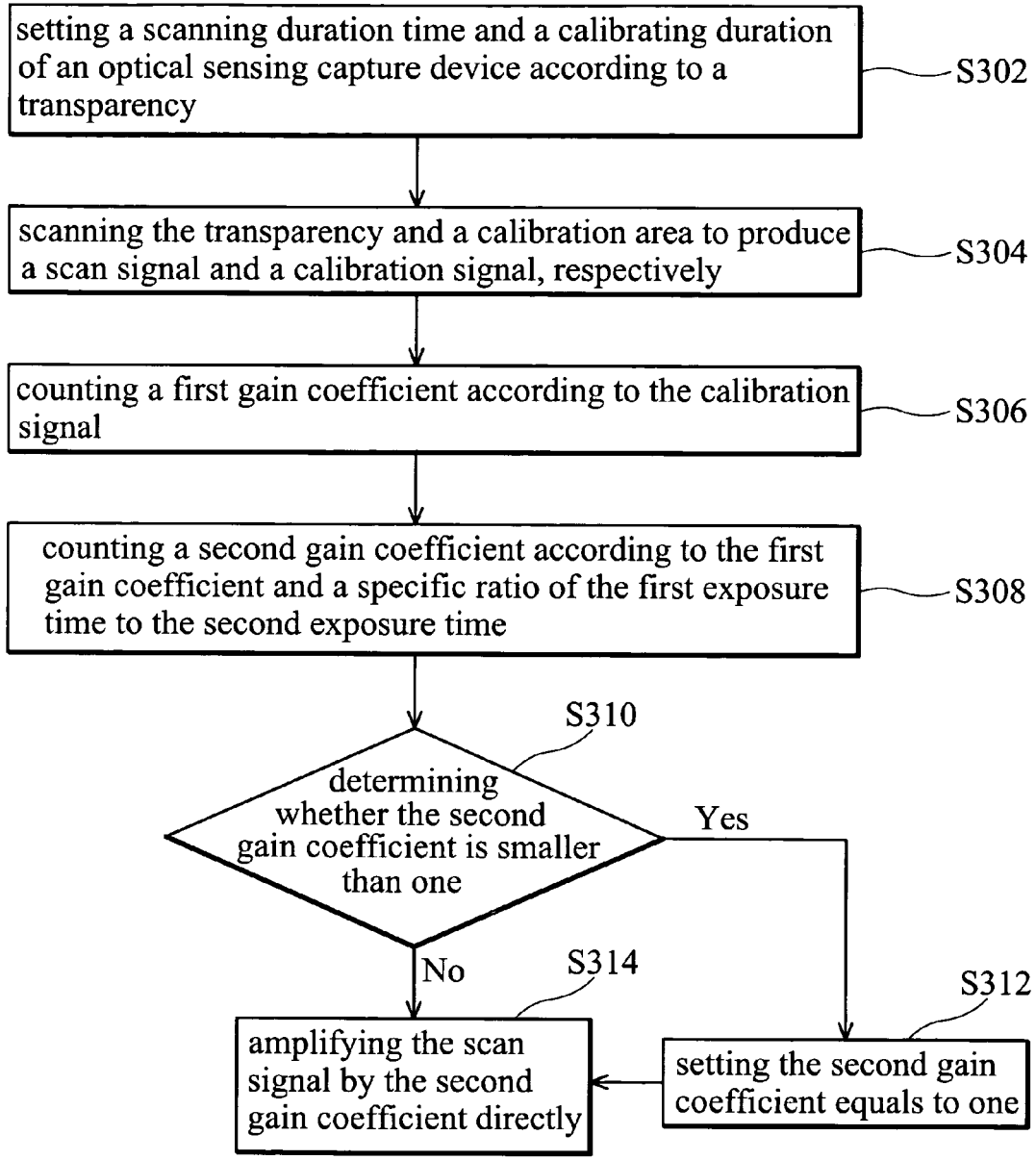
FIG. 3 is a flowchart of a calibration method of a first embodiment of the present invention.

FIG. 3 is a flowchart of a calibration method of the first embodiment of the present invention. The calibration method calibrates the scan signal of a scanner having an optical sensing capture device by linearly adjusting exposure duration.

Step S302 first sets a scanning duration and a calibrating duration of an optical sensing capture device for a transparency, wherein the scanning duration is proportional to the calibrating duration.

Step S304 follows and scans the transparency and a calibration area to produce a scan signal and a calibration signal, respectively, wherein the exposure duration for scanning the transparency is referred to as the scanning duration, and the exposure duration for scanning the calibration area is referred to as the calibrating duration.

Step S306 follows and calculates a first gain coefficient according to the calibration signal, wherein the first gain coefficient is a maximum gain coefficient for amplifying the scan signal to be converted into a maximum digital signal.

Step S308 follows and calculates a second gain coefficient according to the first gain coefficient and a specific ratio of the first exposure duration to the second exposure duration.

The above steps are suitable for scanning a positive film or a highly transmissive object. To scan a negative film or a low transmissive object, however, increased exposure duration is required.

Step S310 follows and determines whether the second gain coefficient is less than one. If the result from step S310 is positive, step S312 follows and sets the second gain coefficient equal to one, and then amplifies the scan signal by the second gain coefficient to maintain the scan signal. If the result is negative, step 314 follows and amplifies the scan signal by the second gain coefficient directly.

Figure 4A:
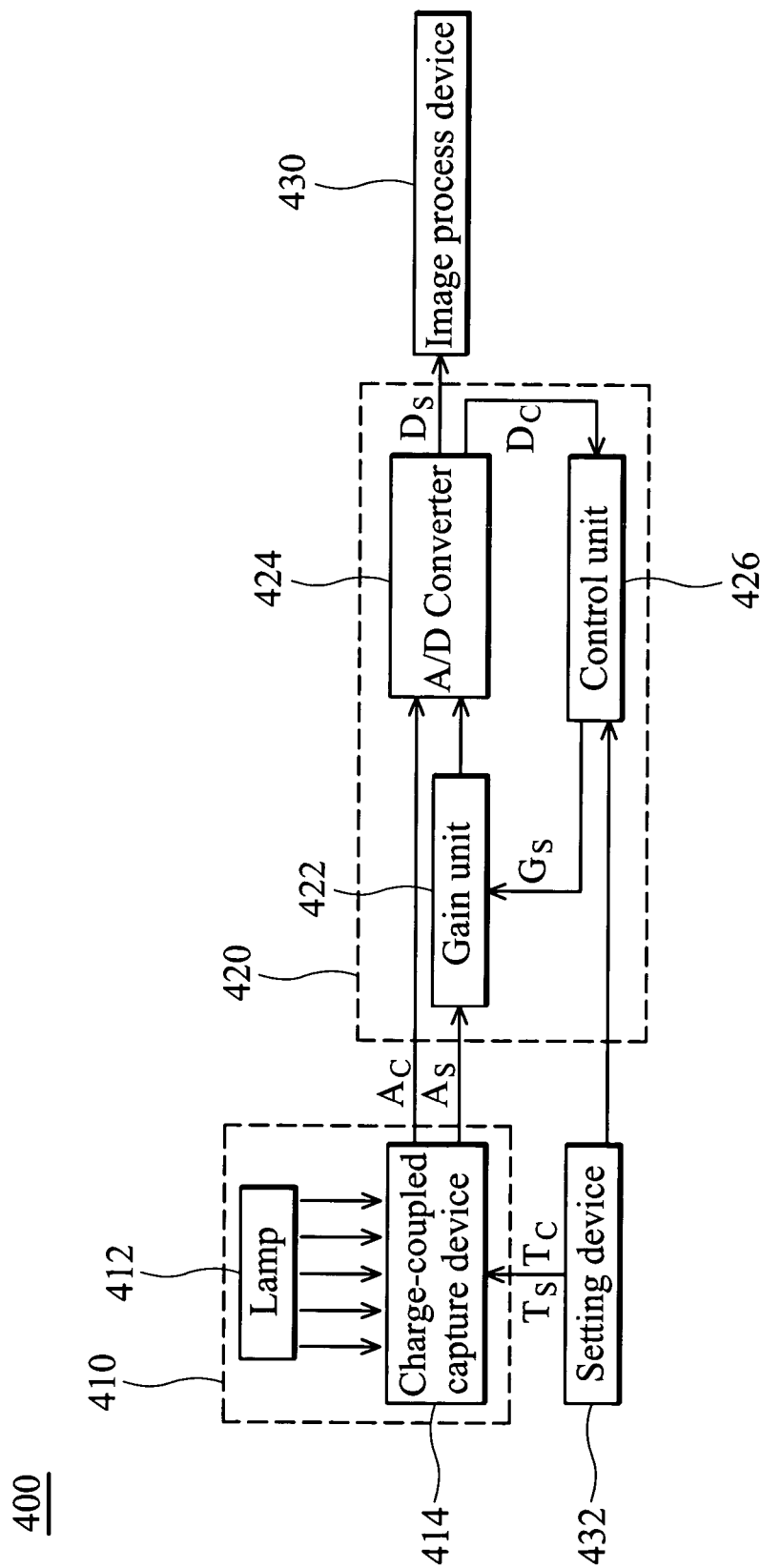
FIG. 4a is a block diagram of the first embodiment of a scanner using the calibration method of FIG. 3.
Figure 4B:
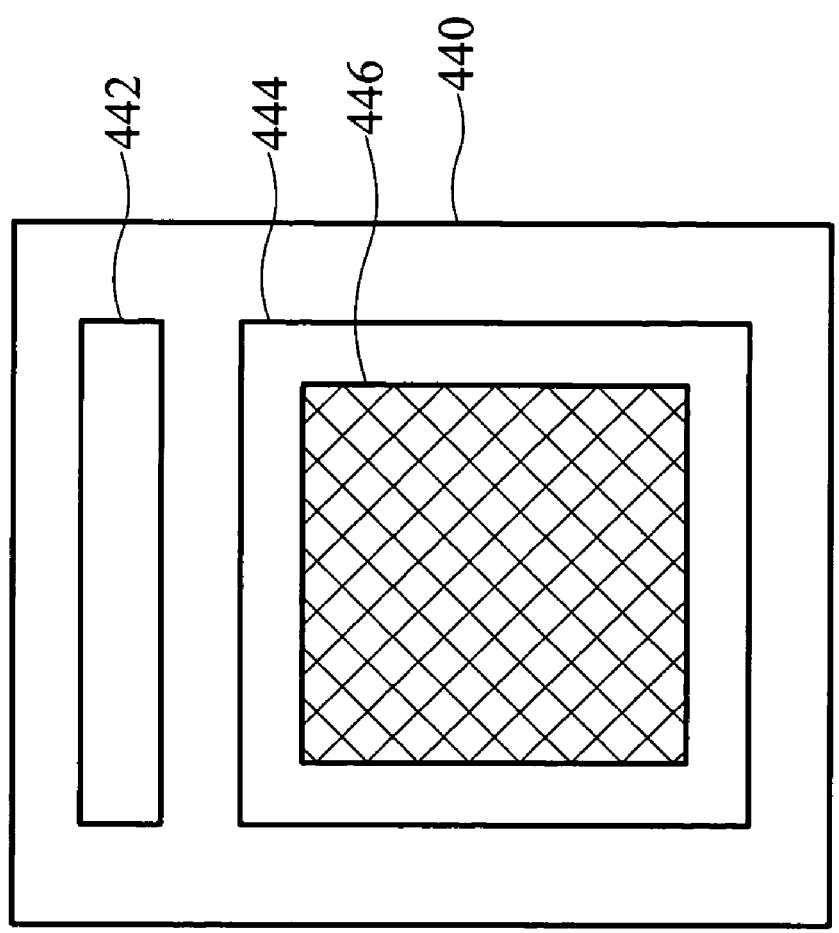

FIG. 4a is a block diagram of the first embodiment of a scanner using the calibration method of FIG. 3. FIG. 4b is a schematic figure of an object placed on a glass platen of the scanner of FIG. 4a. In FIG. 4a and FIG. 4b, a scanner 400 comprises an optical image capture system 410, a signal processing device 420, an image processing device 430 and a setting device 432. The optical image capture system 410 comprises a lamp 412 and a charge-coupled capture device 414, and the signal processing device 420 comprises a gain unit 422, an A/D converter 424 and a control unit 426. A glass platen 440, which is installed between the lamp 412 and the charge-coupled capture device 414, has a calibration area 442 and a scanning area 444 on which the transparency 446 is placed.

Hence, a scanning duration Ts and a calibrating duration Tc of the setting device 432 can be set manually according to the transparency 446. The lamp 412 and the charge-coupled capture device 414 scan the transparency 446 according to the scanning duration Ts, and scan the calibration area 442 according to the calibrating duration Tc, thereby obtaining a scan signal As and a calibration signal Ac, respectively.

The A/D converter 424 converts the scan signal into a digital scan signal Dc according to the scan signal Ac. In addition, the control 426 calculates a gain coefficient Gc according to the digital scan signal Dc, wherein the gain coefficient Gc is a maximum gain coefficient for amplifying the scan signal Ac to be converted into the digital scan signal Dc having a maximum digital value. The maximum digital value, for example, of an 8 bit A/D converter is 255 or near 255 calculated by $2^8-1$.

Next, the control unit 426 calculates a gain coefficient Gs according to the gain coefficient Gc and a specific ratio of the scanning duration Ts to the calibrating duration Tc, wherein the coefficient Gs is calculated by Gs=Gc×Tc/Ts.

The gain unit 422 amplifies the scan signal As according to the gain coefficient Gs. The A/D converter 424 then converts the scan signal As into a digital scan signal Ds and, according to the digital scan signal Ds, the image processing device 430 performs related image processing.

Additionally, when the coefficient Gs is less than one, the control unit 426 sets the coefficient Gs equal to one thereby transmitting the scan signal As to the A/D converter 424 directly.

The transparency 446 is either a positive film or a negative film. For example, when scanning a positive film, a calibrating duration Tc and a scanning duration Ts by the setting device 432 can be set manually, wherein the calibrating duration Tc is equal to one and the scanning duration Ts is equal to twice the calibrating duration Tc or two. The amplitude of the calibration signal Ac then equals half the amplitude of the scan signal As. If the gain coefficient Gc is equal to two, according to the gain coefficient Gc and a specific ratio of the scanning duration Ts to the calibrating duration Tc, the control unit 426 obtains the gain coefficient Gs to be equal to two by the following equations:

$$Dc=Ac \times Gc, \ Ac=Tc \times E \times R;$$

$$Ds=As \times Gs, \ As=Ts \times E \times R;$$

Wherein, E is luminous intensity, R is a response coefficient of the charge-coupled capture device 414. Following above equations, the digital value Dc is equal to the digital value Ds, while Ts=2Tc and Gc=2Gs.

Hence, the scan signal will not saturate the object during calibration and the digital scan signal will have an ideal digital range after the A/D conversion according to the calibration method of the present invention.

A negative film has wider exposure margin than a positive film due to the different film substrate. Hence, to scan the negative film, the scanner 400, requires longer exposure duration. Commonly, the exposure duration of a negative film is 3 to 4 times the value of a positive film. The film substrate is an attenuation factor of the light source. Hence, to obtain the ideal signal, shorter exposure duration requires more calibration, and comparatively, longer exposure duration requires less or no calibration. Thus, the gain coefficient Gs of the setting device 432 is be set as equal to one when scanning the negative film.

Second Embodiment

Figure 5:
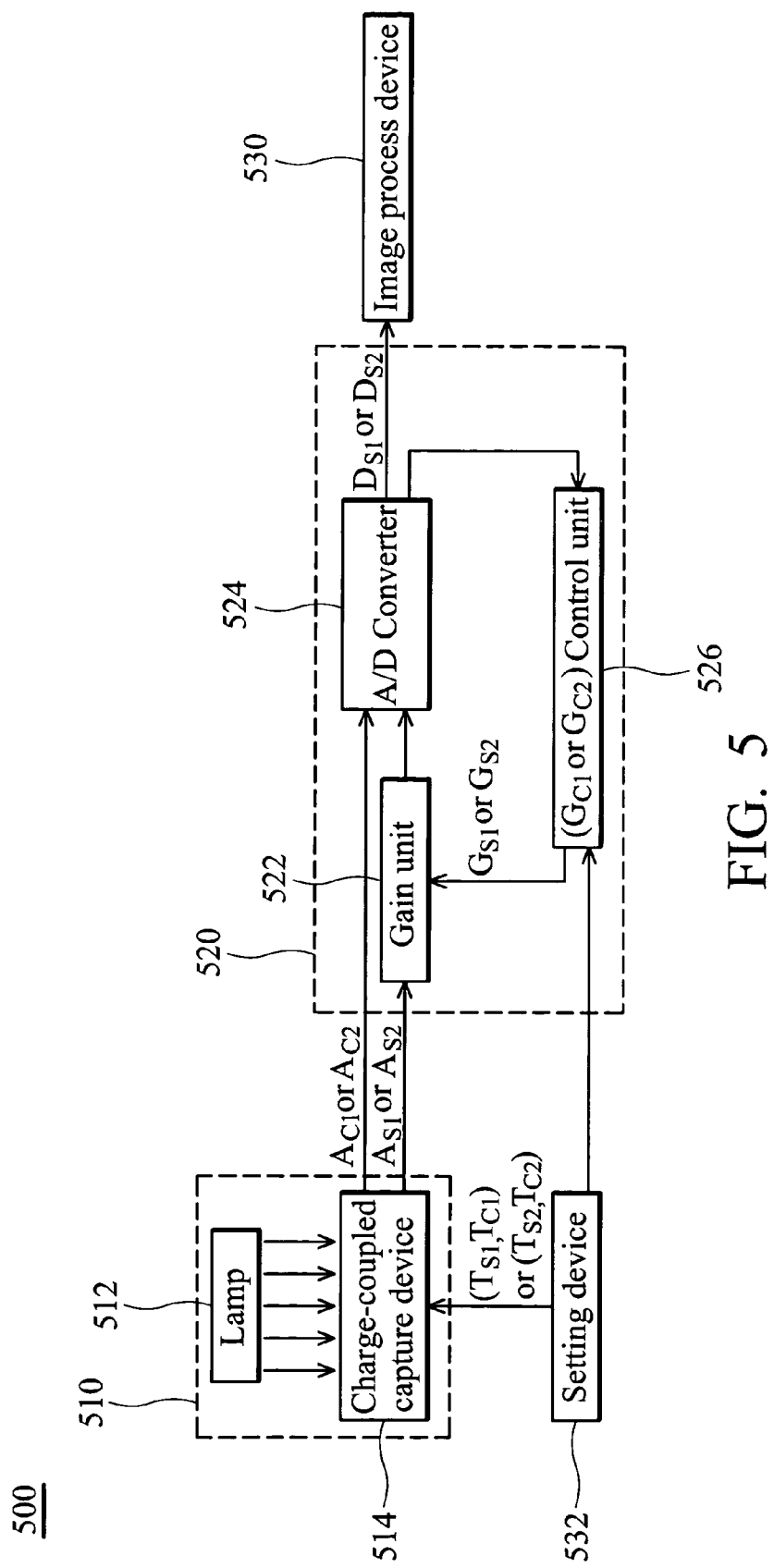
FIG. 5 is a block diagram of a second embodiment of the scanner using the calibration method of FIG. 3.

FIG. 5 is a block diagram of a second embodiment of the scanner using the calibration method of FIG. 3. The scanner 500 comprises an optical image capture system 510, a signal processing device 520, an image processing device 530 and a setting device 532. The optical image capture system 510 comprises a lamp 512 and a charge-coupled capture device 514, and the signal processing device 520 comprises a gain unit 522, an A/D converter 524 and a control unit 526. In this embodiment, the scanner 500 has two scan modes, one of which is chosen for scanning a positive film and the other for scanning a negative film.

When the positive film scan mode is chosen, the lamp 512 and the charge-coupled capture device 514 scan a transparency with scanning duration Ts1 and, scan a calibration area with a calibration duration Tc1 thereby producing a scan signal As1 and a calibration signal Ac1, respectively, wherein the scan signal As1 and the calibration signal Ac1 are predetermined and stored in the setting device 532.

The A/D converter 524 receives and converts the scan signal Ac1 into a digital scan signal Dc1. The control 526 calculates a gain coefficient Gc1 according to the digital scan signal Dc1, wherein the gain coefficient Gc1 is a maximum gain coefficient for amplifying the scan signal to be converted into the digital scan signal having a maximum digital value. The maximum digital value, for example, of an 8 bit A/D converter is 255 or near 255 calculated by $2^8-1$.

Next, the control unit 526 calculates a gain coefficient Gs1 according to the gain coefficient Gc1 and a specific ratio of the scanning duration Ts1 to the calibrating duration Tc1, wherein the coefficient Gs1 is calculated by $G_{S1}=G_{C1} \times T_{C1}/T_{S1}$.

The gain unit 522 amplifies the scan signal As1 by the gain coefficient Gs1. The A/D converter 524 then converts the scan signal As1 into a digital scan signal Ds1. Thus, the image processing device 530 performs related image processing according to digital scan signal Ds1.

When the negative film scan mode is chosen, the lamp 512 and the charge-coupled capture device 514 scan a transparency according to a scanning duration Ts2, and scan a calibration area according to a calibration duration Tc2 thereby producing a scan signal As2 and a calibration signal Ac2, respectively, wherein the scan signal As2 and the calibration signal Ac2 are predetermined and stored in the setting device 532.

A negative film has wider exposure margin than a positive film due to the different film substrate. Hence, to scan the negative film, the scanner 500 requires longer exposure duration. Commonly, the exposure duration of a negative film is 3 to 4 times the value of the positive film. The film substrate is an attenuation factor of a light source. Hence, to obtain the ideal signal, shorter exposure duration requires more calibration, and comparatively, longer exposure duration requires less or no calibration. Thus, the gain coefficient Gs2 of the setting device 532 would be set equal to one when scanning negative film.

Additionally, to obtain an ideal digital range after the A/D conversion, the scan signal must be calibrated as long as possible before conversion thereby increasing the exposure duration. Hence, the present invention further provides a method for increasing the exposure duration.

Figure 6:
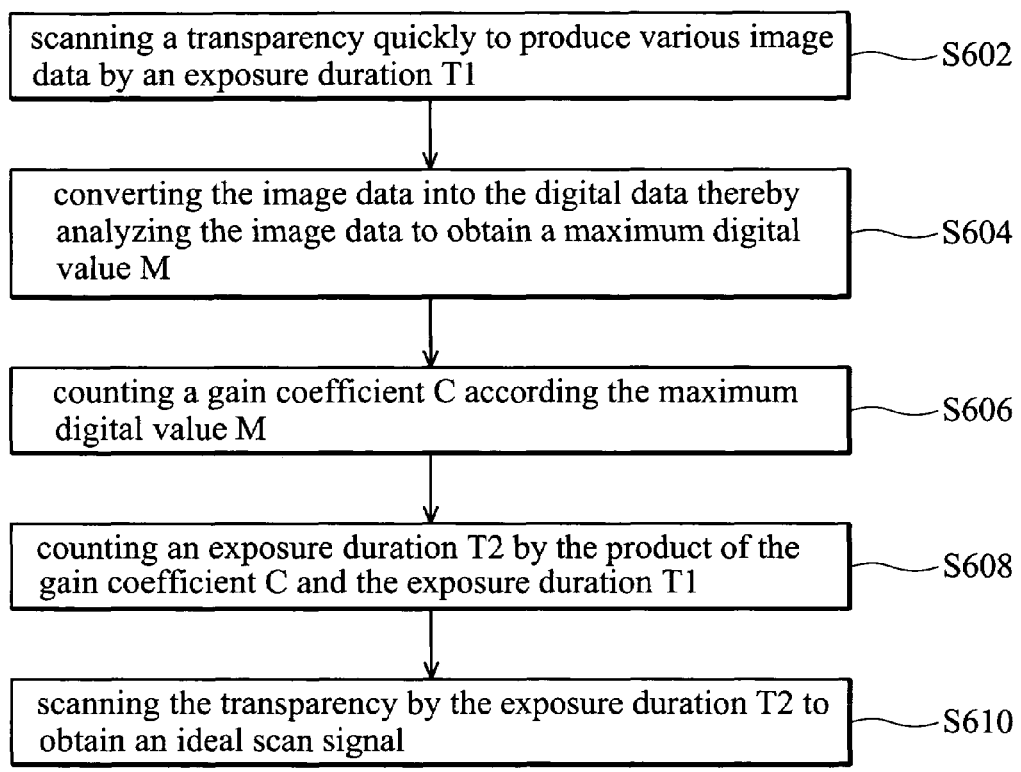
FIG. 6 shows a flowchart of a calibration method of the second embodiment.

FIG. 6 shows a flowchart of a calibration method of the second embodiment. Step S602 first rapidly scans a transparency to produce various image data with exposure duration T1. The exposure duration T1 must be short enough to prevent the various digital data to be converted from the image data from exceeding a maximum value. Step S604 follows and converts the image data into digital data, thereby analyzing the image data to obtain a maximum digital value M. Step S606 follows and calculates a gain coefficient C according the maximum digital value M, wherein the gain coefficient C is a maximum gain coefficient for amplifying the image data to be converted into digital data having the maximum digital value M. The maximum digital value, for example, of an 8 bit A/D converter is 255 near 255 calculated by $2^8-1$, and a gain coefficient C could be calculated by the following equation:

$$C=255/M$$

Hence, the image data, to be converted, is amplified with the gain coefficient C and can obtain the maximum digital value M.

Step S608 follows and calculates an exposure duration T2 by the product of the gain coefficient C and the exposure duration T1, and finally, step S610 follows and scans the transparency with the exposure duration T2 to obtain an ideal scan signal.

Therefore, a calibration method and a scanner with the calibration method of the present invention can calibrate and scan the transparency with two different exposure durations, and calculate a gain coefficient based on a specific calibration to scan signal ratio with the resulting analog signal. Hence, the resulting signal, with any exposure duration, will not cause saturation during calibration, and can obtain an ideal digital signal range after conversion.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A calibration method for a scanner, wherein the calibration method comprises following steps:

setting a first exposure duration and a second exposure duration according to a transparency, wherein the first exposure duration is proportional to the second exposure duration;

scanning the transparency and a calibration area to produce a scan signal and a calibration signal, respectively, wherein the exposure duration for scanning the transparency is referred to as the first exposure duration, and the exposure duration for scanning the calibration area is referred to as the second exposure duration;

calculating a first gain coefficient according to the calibration signal;

calculating a second gain coefficient according to the first gain coefficient and a specific ratio of the first exposure duration to the second exposure duration; and amplifying the scan signal by the second gain coefficient.

2. The calibration method as claimed in claim 1, wherein, after calculating the second gain coefficient, the calibration method further comprises the following steps:

determining whether the second gain coefficient is less than one;

setting the second gain coefficient equal to one if the above result is less than one.

3. The calibration method as claimed in claim 1, wherein a product between the first exposure duration and the first gain coefficient is equal to a product between the second exposure duration and the second gain coefficient.

4. The calibration method as claimed in claim 1, wherein the transparency is a positive film or a negative film.

5. A calibration method for a scanner, having an optical sensing capture device, comprising following steps:

setting a first exposure duration and a second exposure duration according to a transparency, wherein the first exposure duration is proportional to the second exposure duration;

scanning the transparency and a calibration area to produce a scan signal and a calibration signal, respectively, wherein the exposure duration for scanning the transparency is referred to as the first exposure duration, and the exposure duration for scanning the calibration area is referred to as the second exposure duration;

calculating a first gain coefficient according to the calibration signal, wherein the first gain coefficient is a maximum gain coefficient for amplifying the scan signal to be converted into a digital scan signal having a maximum digital value;

calculating a second gain coefficient according to the first gain coefficient and the specific ratio of the first exposure duration to the second exposure duration; and amplifying the scan signal by the second gain coefficient.

6. The calibration method as claimed in claim 5, wherein the calibration method further comprises the following steps after calculating the second gain coefficient:

determining whether the second gain coefficient is less than one;

setting the second gain coefficient equal to one if the above result is less than one.

7. The calibration method as claimed in claim 5, wherein a product between the first exposure duration and the first gain coefficient is equal to a product between the second exposure duration and the second gain coefficient.

8. The calibration method as claimed in claim 5, wherein the transparency is a positive film or a negative film.

9. The calibration method as claimed in claim 5, wherein the optical sensing capture device is a charge-coupled capture device.

10. The calibration method as claimed in claim 5, wherein the optical sensing capture device operates in a linear sensing range according to either the first exposure duration or the second exposure duration.

11. A scanner, comprising:

a optical image capture system having an optical sensing capture device, for scanning a transparency for a first exposure duration to produce a scan signal, and scanning a calibration area for a second exposure duration to produce a calibration signal; and a signal processing device, for calculating a first gain coefficient according to the calibration signal; according to the first gain and a specific ratio, calculating a second gain coefficient; according to the second gain coefficient, amplifying the scan signal and, converting the amplified scan signal into a digital signal.

12. The scanner as claimed in claim 11, further comprising a setting device for setting the first exposure duration and the second exposure duration according to the transparency.

13. The scanner as claimed in claim 11, wherein the transparency is a negative film.

14. The scanner as claimed in claim 12, wherein the setting device sets the second gain coefficient as equal to one.

15. The scanner as claimed in claim 12, wherein the signal processing device further comprises:

a gain unit for amplifying the scan signal by the second gain coefficient.

an A/D converter for converting the amplified scan signal into the digital scan signal, and converting the calibration signal into a digital calibration signal; and a control unit for calculating the first gain coefficient by the digital calibration signal, and calculating the second gain coefficient according to the first gain coefficient and a specific ratio of the first exposure duration to the second exposure duration;

wherein the first gain coefficient is a maximum gain coefficient for amplifying the scan signal to be converted into the digital scan signal having a maximum digital value.

16. The scanner as claimed in claim 11, wherein the signal processing device determines whether the second gain coefficient is less than one, and converts the scan signal into the digital scan signal if the result is positive.

17. The scanner as claimed in claim 11, wherein a product between the first exposure duration and the first gain coefficient is equal to a product between the second exposure duration and the second gain coefficient.

18. The scanner as claimed in claim 11, wherein the transparency is a positive film or a negative film.

19. The scanner as claimed in claim 11, wherein the optical image capture system comprises:

a lamp for exposing the transparency and the calibration area; and an optical sensing capture device for receiving and storing the images shown on the transparency and the calibration area after illumination.

20. The scanner as claimed in claim 19, wherein the optical sensing capture device is a charge-coupled capture device.

21. The scanner as claimed in claim 19, wherein the optical sensing capture device works in the linear sensing range according to either the first exposure duration or the second exposure duration.

* * * * *